United States Patent
Cavitt et al.

(10) Patent No.: US 10,583,764 B1
(45) Date of Patent: Mar. 10, 2020

(54) VEHICLE HAVING FLOOR MAT ASSEMBLY

(71) Applicants: Noah Cavitt, Lake Orion, MI (US); Jacob A. St. George, Royal Oak, MI (US)

(72) Inventors: Noah Cavitt, Lake Orion, MI (US); Jacob A. St. George, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/161,187

(22) Filed: Oct. 16, 2018

(51) Int. Cl.
*B60N 3/04* (2006.01)

(52) U.S. Cl.
CPC ............. *B60N 3/048* (2013.01); *B60N 3/046* (2013.01)

(58) Field of Classification Search
CPC .......... B60N 3/04; B60N 3/046; B60N 3/048; B60N 3/044; B32B 7/08; B32B 3/266; B32B 3/14
USPC ...................................................... 296/97.23
See application file for complete search history.

(56) References Cited

U.S. PATENT DOCUMENTS

| | | | |
|---|---|---|---|
| 2,650,855 A | 9/1953 | Peirce | |
| 3,337,258 A * | 8/1967 | Steinberg | B60N 3/04 296/97.23 |
| 3,424,265 A * | 1/1969 | Stata | B60N 3/044 180/90.6 |
| 3,488,081 A | 1/1970 | Nolen | |
| 4,765,670 A | 8/1988 | Jackson | |
| 4,921,742 A | 5/1990 | Altus | |
| 5,149,572 A | 9/1992 | Gaggero et al. | |
| 5,830,560 A * | 11/1998 | Koa | B60N 3/044 428/192 |
| 5,919,540 A * | 7/1999 | Bailey | B32B 3/266 428/67 |
| 6,114,014 A * | 9/2000 | Ikeda | B60N 3/044 264/239 |
| 6,361,099 B1 | 3/2002 | McIntosh et al. | |
| 6,817,649 B1 | 11/2004 | Stanesic | |
| 7,648,187 B2 * | 1/2010 | Hoffman | B60N 3/046 296/97.23 |
| 8,163,369 B2 | 4/2012 | Stanesic et al. | |
| 8,833,834 B2 * | 9/2014 | MacNeil | B29D 99/0057 296/97.23 |
| 9,016,756 B2 * | 4/2015 | Goto | B60N 3/046 16/4 |
| 9,796,311 B2 * | 10/2017 | Veik | B60N 3/046 |
| 10,336,233 B2 * | 7/2019 | De Jesus | B60N 3/046 |

(Continued)

*Primary Examiner* — Gregory A Blankenship
(74) *Attorney, Agent, or Firm* — Ralph E Smith

(57) ABSTRACT

A floor mat assembly includes an extended floor mat and a connecting floor mat. The extended floor mat includes a floor portion and an interlocking portion. The interlocking portion extends from the floor portion and includes a body, at least one first rib and at least one second rib. The body defines a channel. The at least one first rib and the at least one second rib are disposed within the channel and cooperate to form a compartment. The connecting floor mat includes a floor portion and an adapter portion. The adapter portion extends from the floor portion and includes at least one locking tab. The extended floor mat and the connecting floor mat interlock when the at least one locking tab is received in the compartment, thereby restricting lateral movement of the extended floor mat and the connecting floor mat relative to each other.

15 Claims, 11 Drawing Sheets

(56) References Cited

U.S. PATENT DOCUMENTS

| | | | |
|---|---|---|---|
| 2006/0091695 A1* | 5/2006 | MacNeil | B60R 21/02 296/97.23 |
| 2007/0087163 A1 | 4/2007 | Lasly | |
| 2013/0260083 A1* | 10/2013 | Price | B29C 45/14786 428/95 |
| 2018/0229637 A1* | 8/2018 | Parra Becerra | B60N 3/044 |
| 2018/0339631 A1* | 11/2018 | Willobee | B60N 3/048 |

* cited by examiner

VEHICLE HAVING FLOOR MAT ASSEMBLY

FIELD

The present disclosure relates to a vehicle having a floor mat assembly.

BACKGROUND

This section provides background information related to the present disclosure and is not necessarily prior art.

A floor mat can include a single, unitary body that extends across a row of a vehicle and is disposed on a floor of the vehicle. The floor mat collects fluids and debris, for example, thereon so that they are not spilled onto the floor of the vehicle. However, the cumbersome size of the floor mat often leads to difficulty installing and removing the floor mat into and from the vehicle. Furthermore, the cumbersome size of the floor mat also leads to inadvertently spilling fluid and debris thereon onto the floor of the vehicle when a user attempts to remove the floor mat from the vehicle. The teachings of the present disclosure provide a floor mat assembly that is conveniently installed into and removed from the vehicle, and avoids inadvertent fluid and debris spills onto the floor of the vehicle when the floor mat assembly is removed from the vehicle.

SUMMARY

This section provides a general summary of the disclosure, and is not a comprehensive disclosure of its full scope or all its features.

In one form, the present disclosure provides a floor mat assembly configured to at least partially cover a floor of a vehicle. The floor mat assembly includes an extended floor mat and a connecting floor mat. The extended floor mat includes a floor portion and an interlocking portion. The interlocking portion extends from a periphery of the floor portion and includes a body, at least one first rib and at least one second rib. The body defining a channel. The at least one first rib and the at least one second rib disposed in the channel of the body. The at least one first rib and the at least one second rib cooperate to form a compartment therebetween. The connecting floor mat includes a floor portion and an adapter portion. The adapter portion extends from a periphery of the floor portion and includes at least one locking tab. The extended floor mat and the connecting floor mat interlock when the at least one locking tab is received in the compartment to restrict lateral movement of the extended floor mat and the connecting floor mat relative to each other.

In some configurations of the floor mat assembly of the above paragraph, the floor portion of the extended floor mat includes a base surface. The base surface has a plurality of elongated gripping members.

In some configurations of the floor mat assembly of any one or more of the above paragraphs, the floor portion of the connecting floor mat includes a base surface. The base surface has a plurality of elongated gripping members.

In some configurations of the floor mat assembly of any one or more of the above paragraphs, the channel of the body is defined by an inner wall, an intermediate wall and an outer wall.

In some configurations of the floor mat assembly of any one or more of the above paragraphs, the at least one first rib extends laterally across the channel and includes a first angled surface and a first horizontal surface.

In some configurations of the floor mat assembly of any one or more of the above paragraphs, the first angled surface of the at least one first rib extends upwardly from a bottom end of the inner wall to an end of the first horizontal surface and the first horizontal surface extends from an end of the first angled surface to the outer wall.

In some configurations of the floor mat assembly of any one or more of the above paragraphs, the at least one second rib extends laterally across the channel and includes a second angled surface and a second horizontal surface.

In some configurations of the floor mat assembly of any one or more of the above paragraphs, the second angled surface extends upwardly from a bottom end of the outer wall to an end of the second horizontal surface and the second horizontal surface extends from an end of the second angled surface to the inner wall.

In some configurations of the floor mat assembly of any one or more of the above paragraphs, the at least one locking tab includes a plurality of walls that cooperate to define a cavity.

In another form, the present disclosure provides a floor mat assembly configured to at least partially cover a floor of a vehicle. The floor mat assembly includes an extended floor mat and a connecting floor mat. The extended floor mat includes a floor portion and an interlocking portion. The interlocking portion extends from a periphery of the floor portion and includes a first body, a plurality of first ribs, a plurality of second ribs and a partition. The first body includes an inner wall, an intermediate wall and an outer wall that cooperates to define a cavity. The plurality of first ribs are disposed within the cavity and along the outer wall. The plurality of second ribs are disposed within the cavity and long the inner wall. The partition is disposed within the cavity and extends laterally across the cavity. The connecting floor mat includes a floor portion and an adapter portion. The adapter portion extends from a periphery of the floor portion and includes a second body, a plurality of first grooves and a plurality of second grooves. The body including an inside wall, a transition wall and an outside wall. The pocket formed in the second body. The plurality of first grooves are formed in the inside wall and the plurality of second grooves are formed in the outside all. The extended floor mat and the connecting floor mat interlock when the plurality of first ribs are received in the plurality of first grooves, the plurality of second ribs are received in the plurality of second grooves and the partition is received in the pocket, thereby restricting vertical and lateral movement of the extended floor mat and the connecting floor mat relative to each other.

In some configurations of the floor mat assembly of the above paragraph, the partition of the extended floor mat is disposed between a pair of the plurality of first ribs and a pair of the plurality of second ribs.

In some configurations of the floor mat assembly of any one or more of the above paragraphs, the pocket formed in the second body is between a pair of the plurality of first grooves and a pair of the plurality of second grooves.

In some configurations of the floor mat assembly of any one or more of the above paragraphs, the interlocking portion of the extended floor mat is disposed over the adapter portion of the connecting floor mat once the extended floor mat and the connecting floor mat interlock.

In some configurations of the floor mat assembly of any one or more of the above paragraphs, the plurality of first ribs and the plurality of second ribs face each other within the cavity.

In some configurations of the floor mat assembly of any one or more of the above paragraphs, a cross-section of the interlocking portion is H-shaped.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
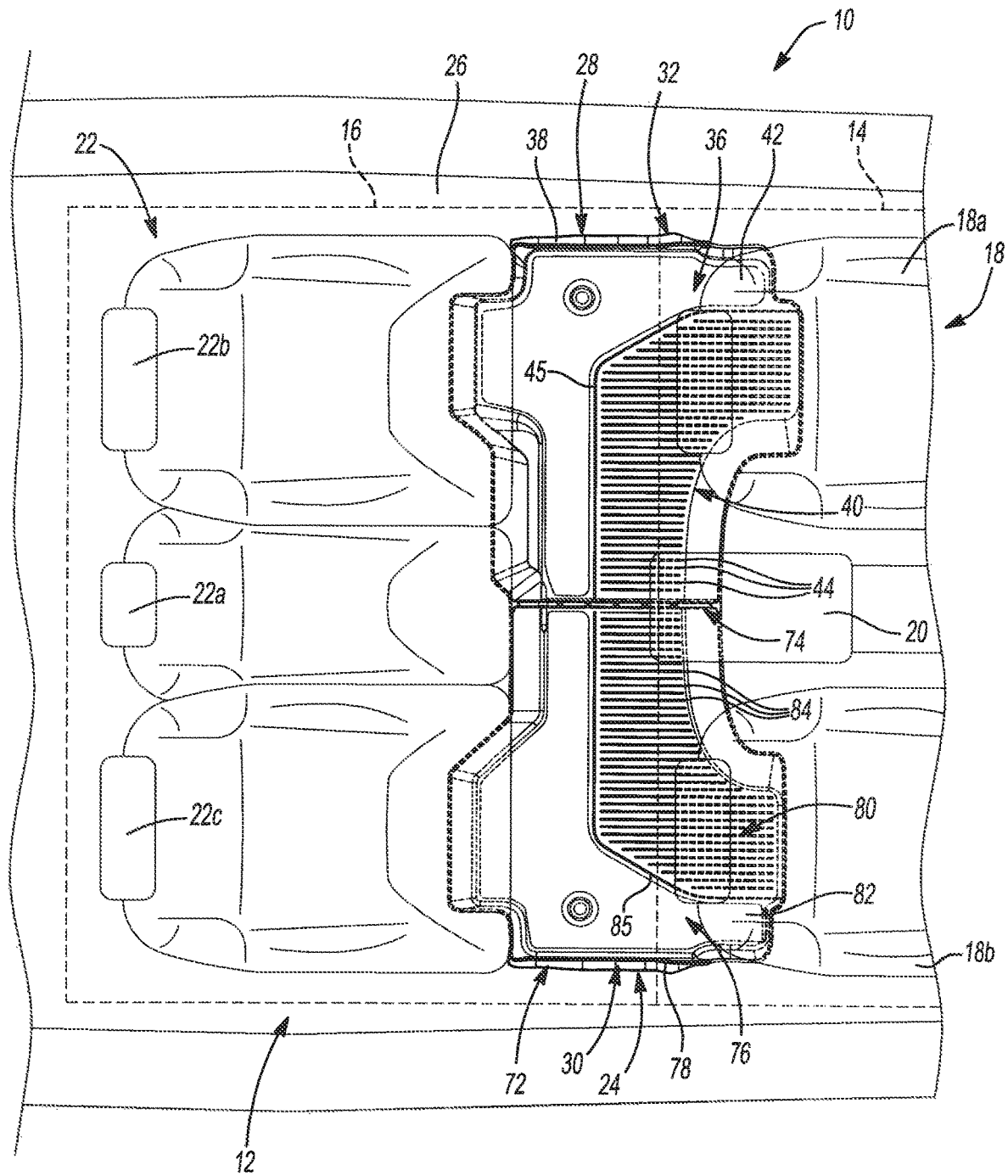
FIG. 1 is a top view of a floor mat assembly disposed on a floor of a vehicle according to the principles of the present disclosure.
Figure 2:
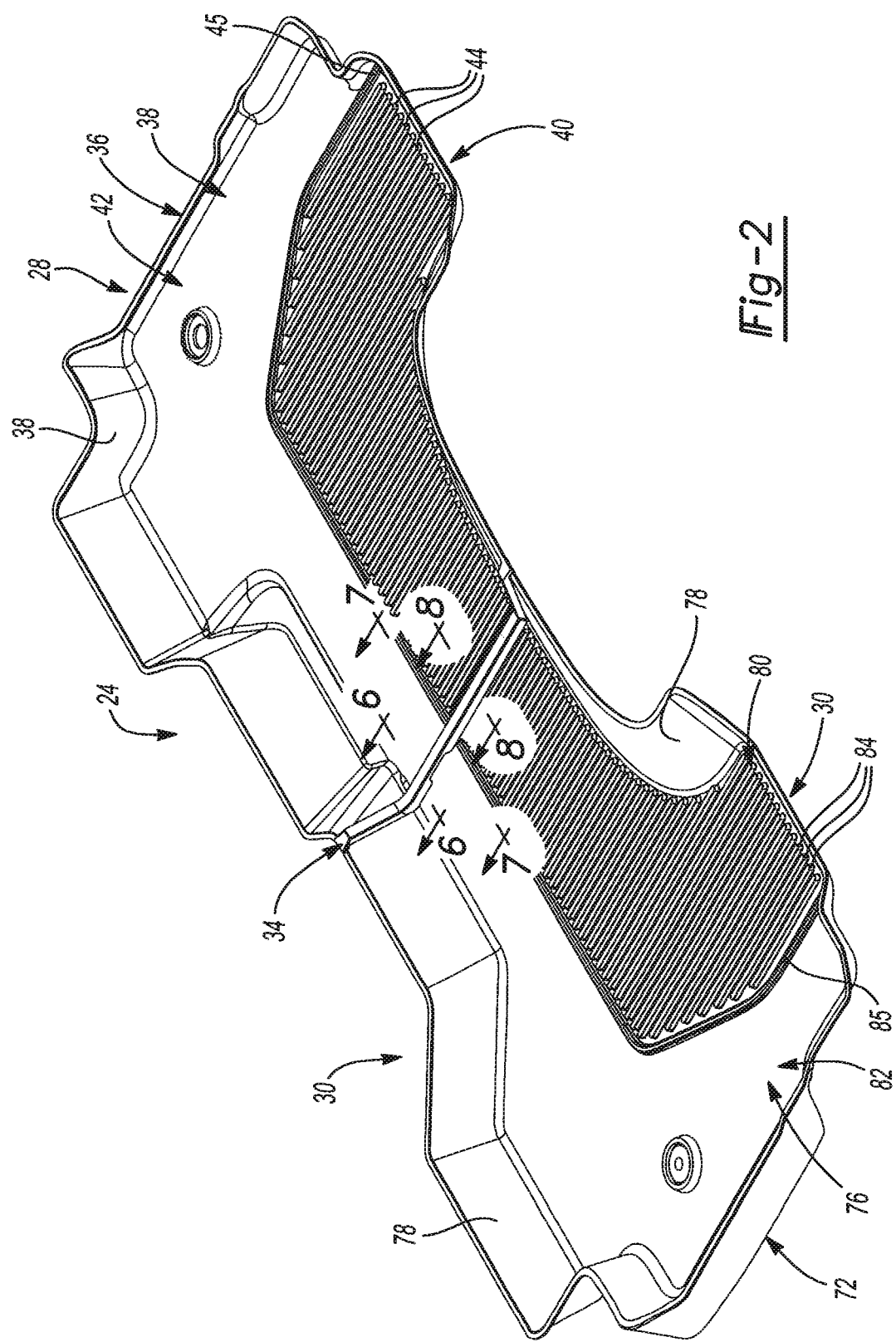
FIG. 2 is a perspective view of the floor mat assembly of FIG. 1 in the assembled position.
Figure 3:
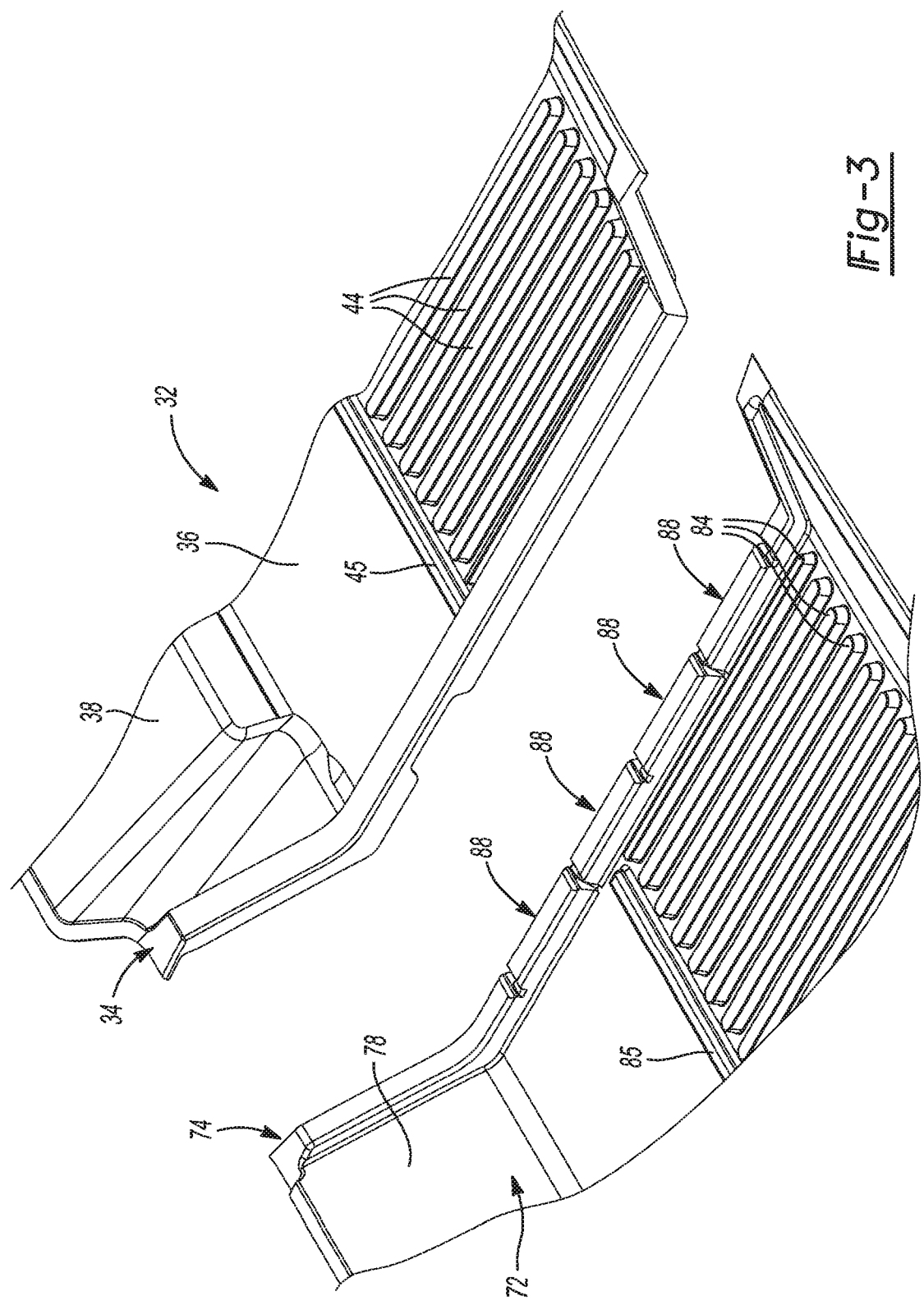
FIG. 3 is an exploded view of a portion of the floor mat assembly of FIG. 1.

With reference to FIG. 1, a vehicle 10 having an occupancy compartment 12 is provided. The occupancy compartment 12 includes at least a front row 14 and a rear row 16. A driver seat 18a and a passenger seat 18b (together known as a front seat assembly 18) are disposed in the front row 14 of the occupancy compartment 12. An arm rest compartment 20 is disposed in the front row 14 of the occupancy compartment 12 between the driver seat 18a and the passenger seat 18b, and partially extends into the rear row 16 of the occupancy compartment 12. A rear seat assembly 22 is disposed in the rear row 16 of the occupancy compartment 12 and includes a middle seat 22a positioned between left and right seats 22b, 22c.

As shown in FIG. 1, a floor mat assembly 24 is substantially disposed in the rear row 16 of the occupancy compartment 12 on a vehicle floor 26 of the vehicle 10, and partially extends into the front row 14 of the occupancy compartment 12. The floor mat assembly 24 is also disposed between the front seat assembly 18 and the rear seat assembly 22 and substantially extends the width of the occupancy compartment 12. The floor mat assembly 24 includes an extended floor mat 28 disposed at a left side of the rear row 16 and a connecting floor mat 30 disposed at a right side of the rear row 16. As will be described in more detail below, the extended floor mat 28 and the connecting floor mat 30 interlock to restrict horizontal movement (i.e., lateral and front-to-back) relative to each other.

With reference to FIGS. 1-7, the extended floor mat 28 is substantially rectangular-shaped and is made out of a copolymer material (e.g., thermoplastic elastomer). It should be understood that although the extended floor mat 28 in the present disclosure is substantially rectangular-shaped, the extended floor 28 can be any other suitable shape depending on the configuration of the vehicle floor 26. The extended floor mat 28 is formed from a molding process (e.g., injection molding) and includes a floor portion 32 and an interlocking portion 34. The floor portion 32 includes design features that accommodate floor configurations of vehicles that the extended floor mat 28 is disposed therein. For example, in the embodiment illustrated herein, the floor portion 32 includes a base surface 36 and a rim 38.

The base surface 36 includes one section 40 (FIGS. 1-3) and another section 42 (FIGS. 1, 2 and 6-8). The one section 40 includes a plurality of first elongated gripping members 44 and a second elongated gripping member 45. The first gripping members 44 extend upwardly from the base surface 36. The first gripping members 44 extend from a rear end of the one section 40 toward a front end of the one section 40. The second gripping member 45 extends upwardly from the base surface 36. The second gripping member 45 extends around a periphery of the one section 40. The rim 38 extends from and around a periphery of the base surface 36 and away from the vehicle floor 26.

Figure 4:
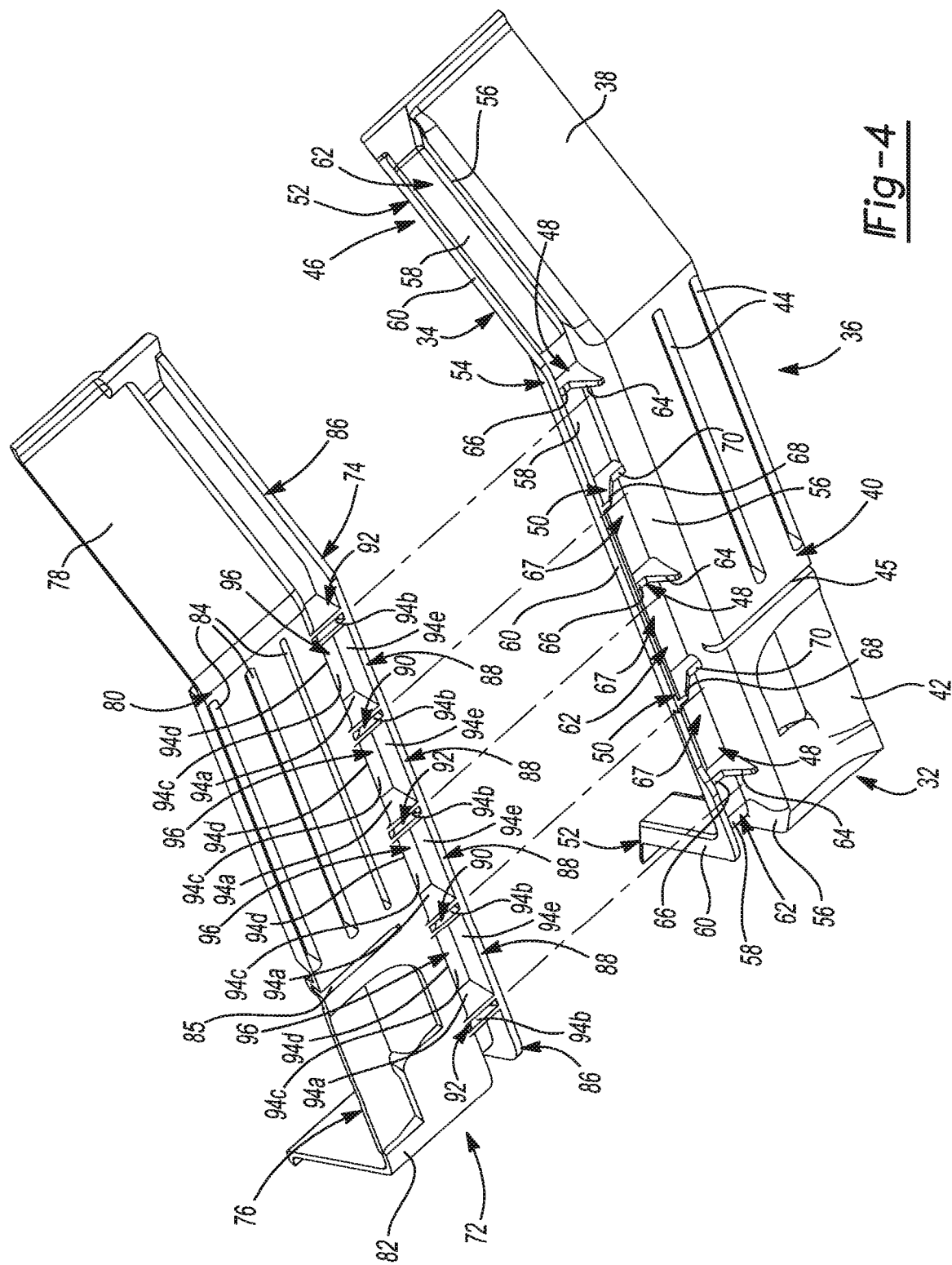
FIG. 4 is another exploded view of a portion of the floor mat assembly of FIG. 1.
Figure 5:
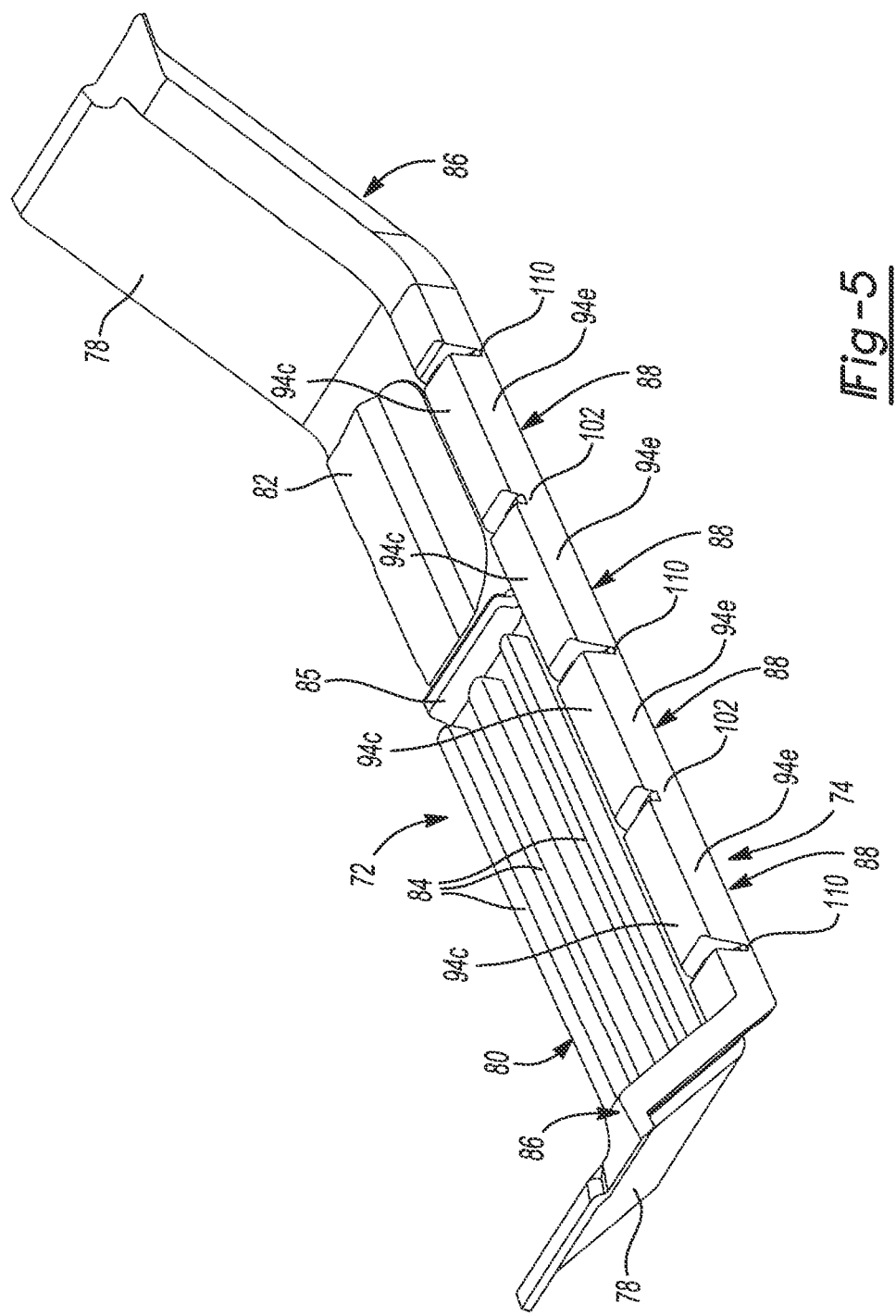
FIG. 5 is a perspective view of a portion of a connecting floor mat of the floor mat assembly of FIG. 1.
Figure 6:
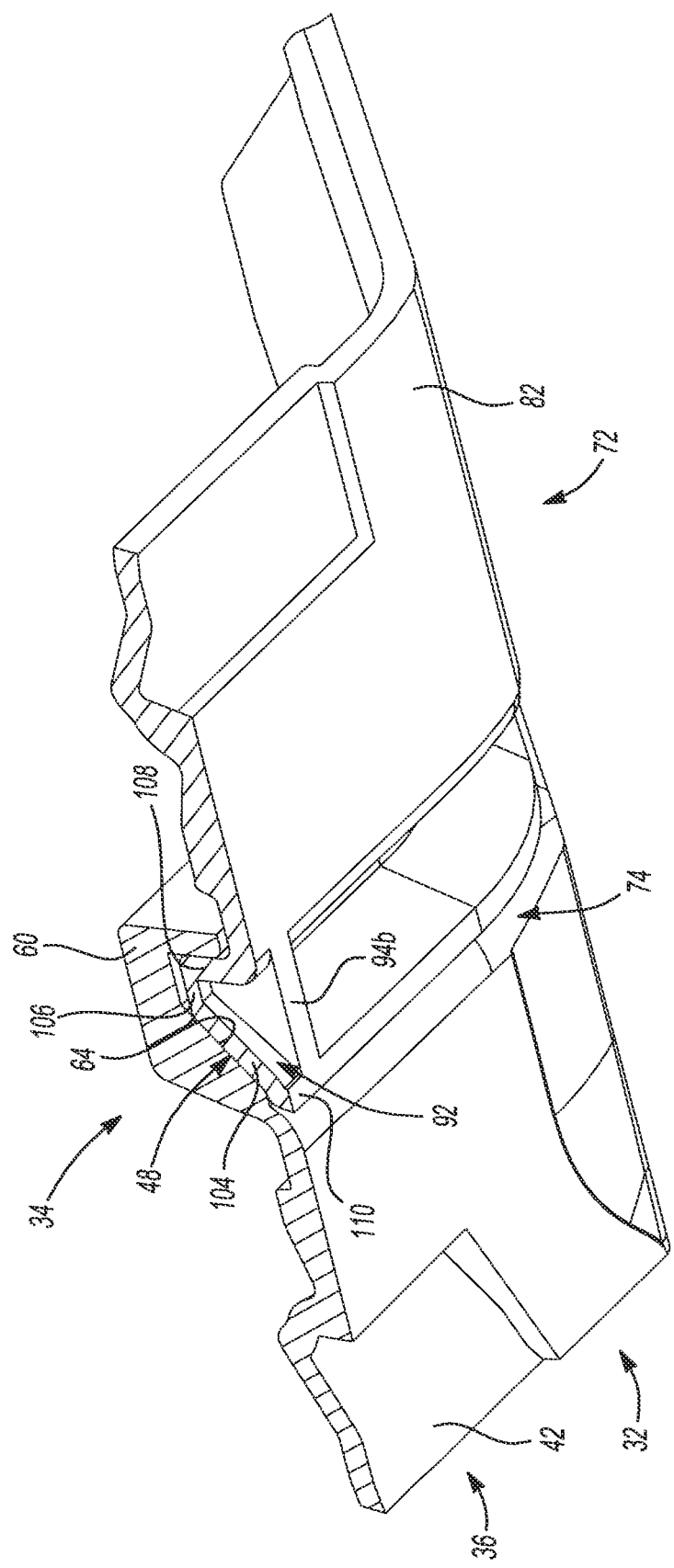
FIG. 6 is a partial cross-sectional view of a portion of the floor mat assembly taken along line 6-6 of FIG. 2.
Figure 7:
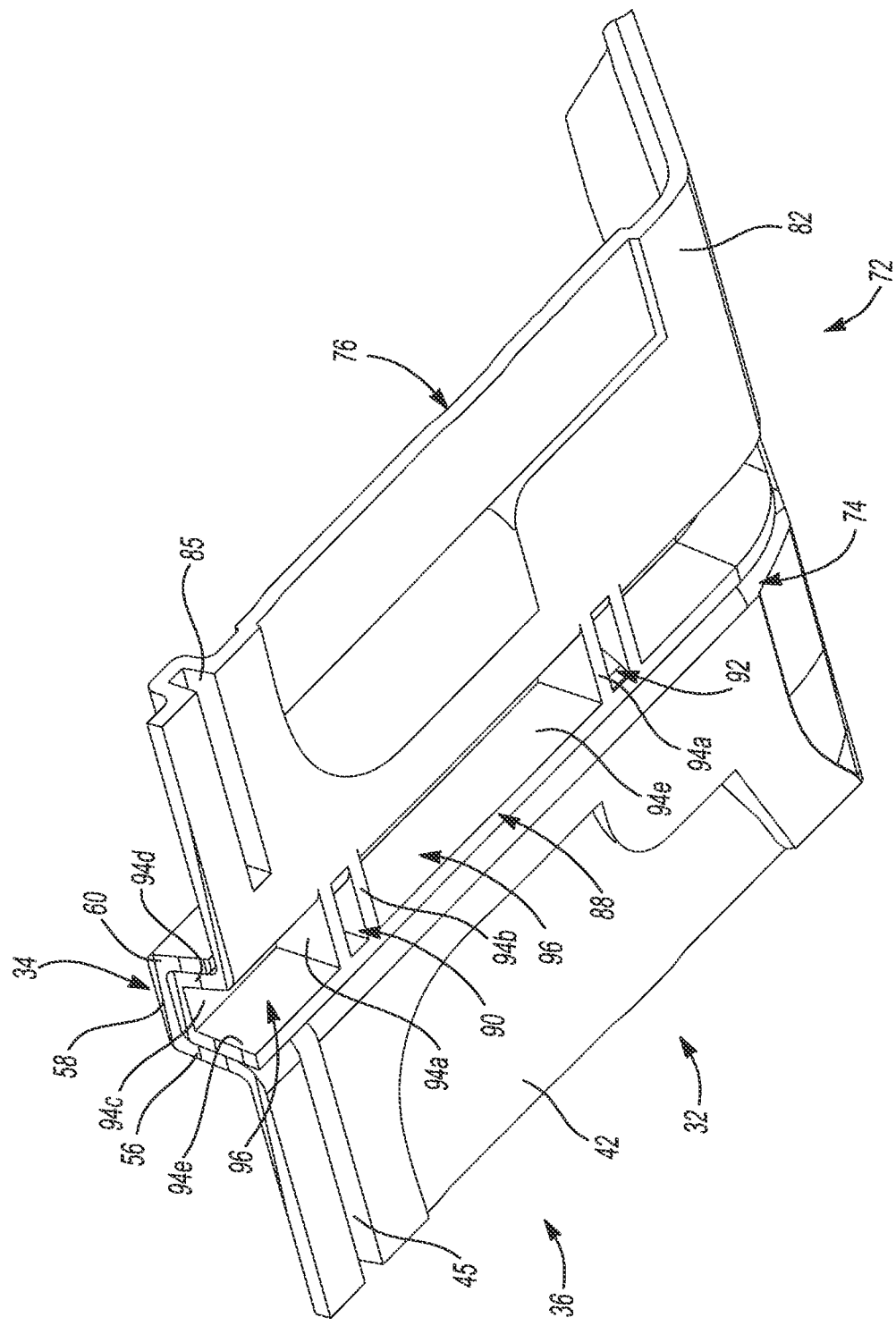
FIG. 7 is a partial cross-sectional view of a portion of the floor mat assembly taken along line 7-7 of FIG. 2.
Figure 8:
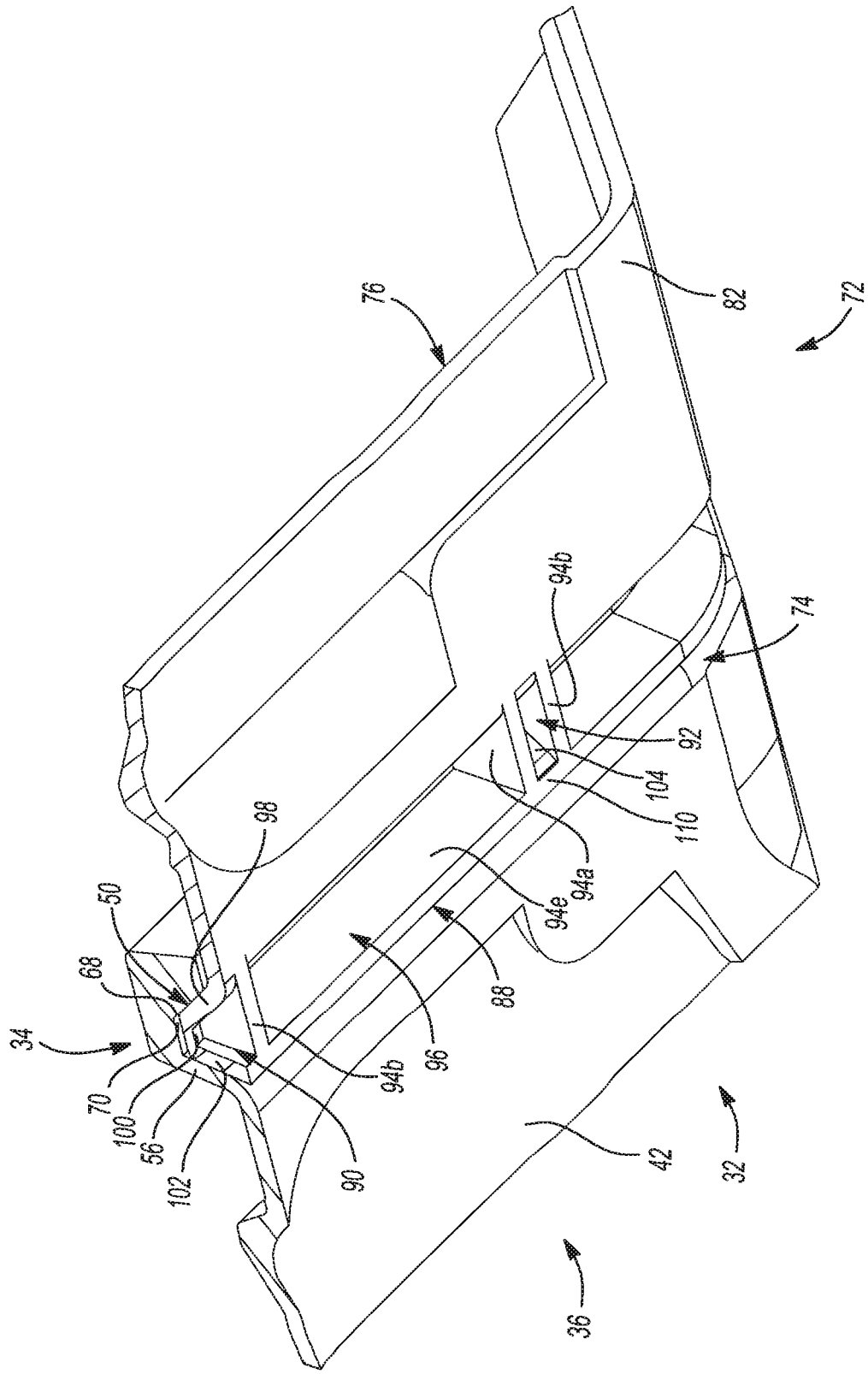
FIG. 8 is a partial cross-sectional view of a portion of the floor mat assembly taken along line 8-8 of FIG. 2.
Figure 9:
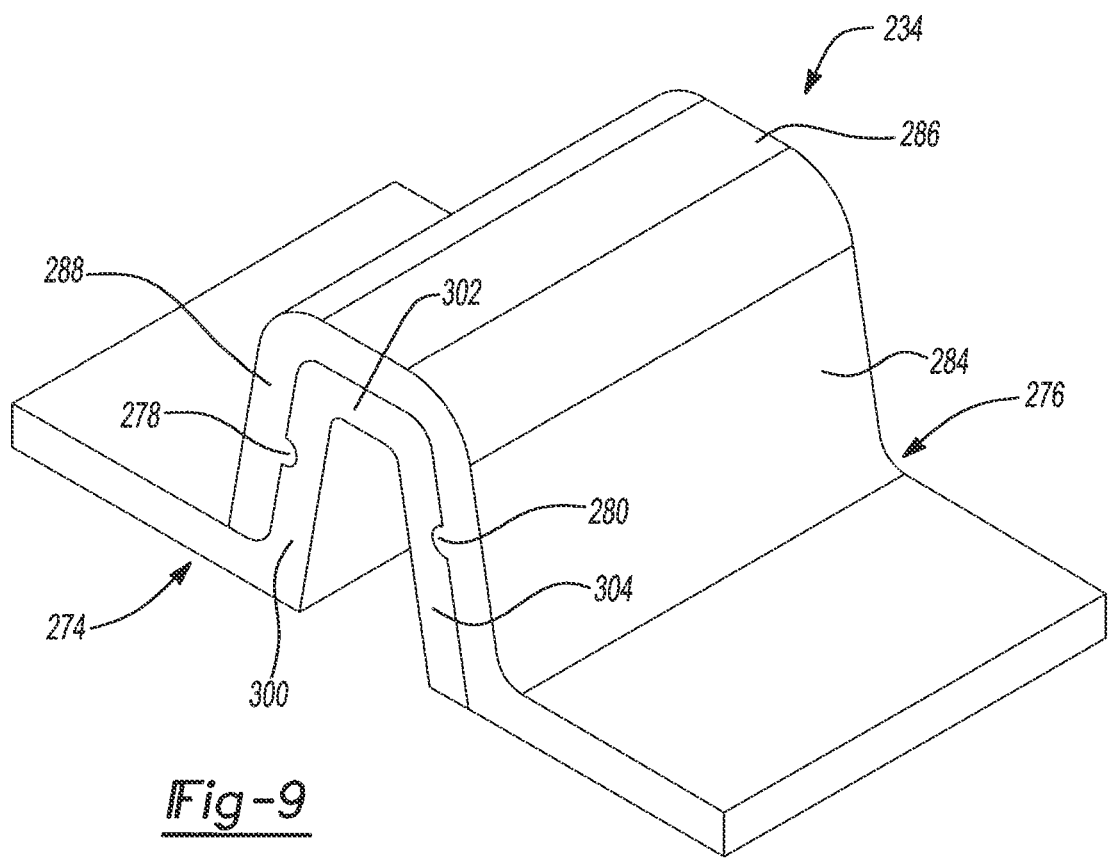
FIG. 9 is a perspective view of an alternate interlocking portion and adapter portion.
Figure 10:
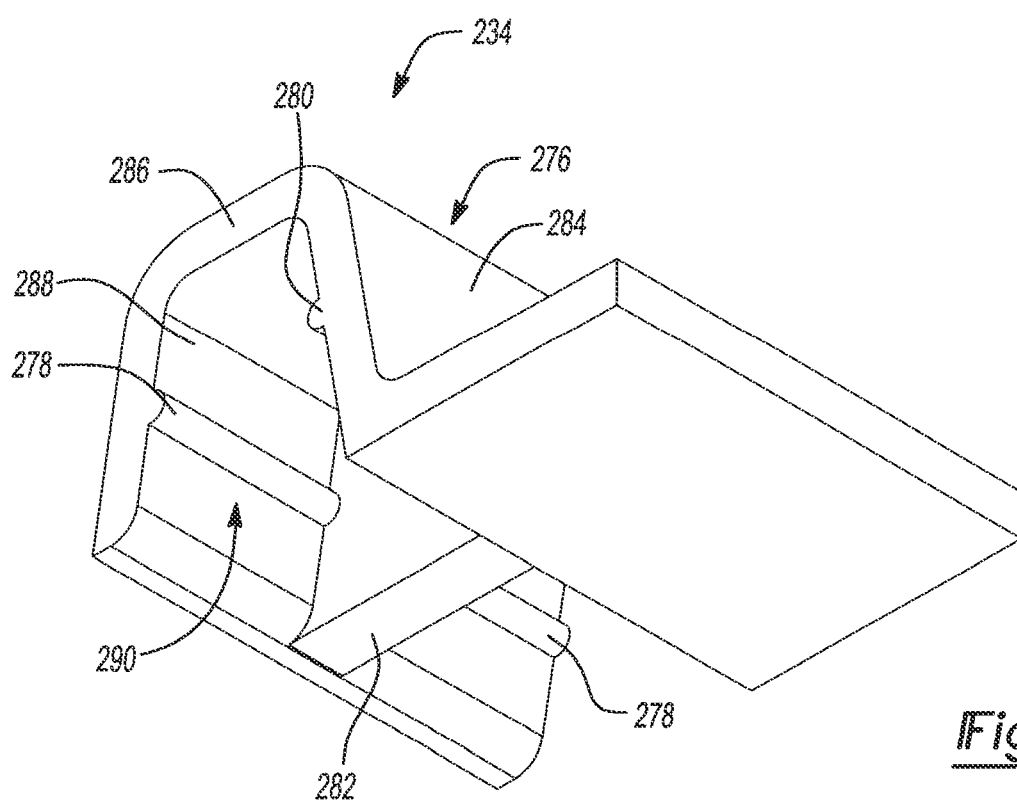
FIG. 10 is a bottom perspective view of the interlocking portion of FIG. 9.
Figure 11:
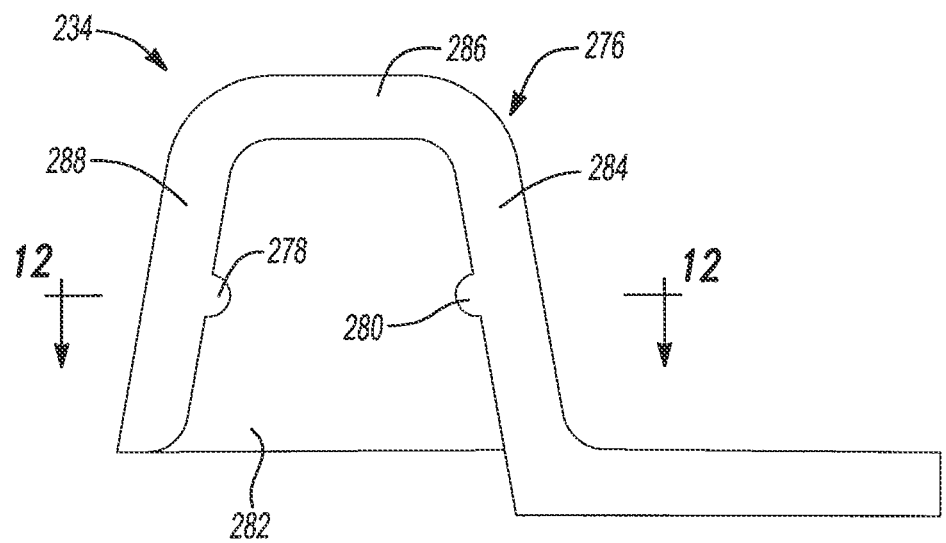
FIG. 11 is a front view of the interlocking portion of FIG. 8.
Figure 12:
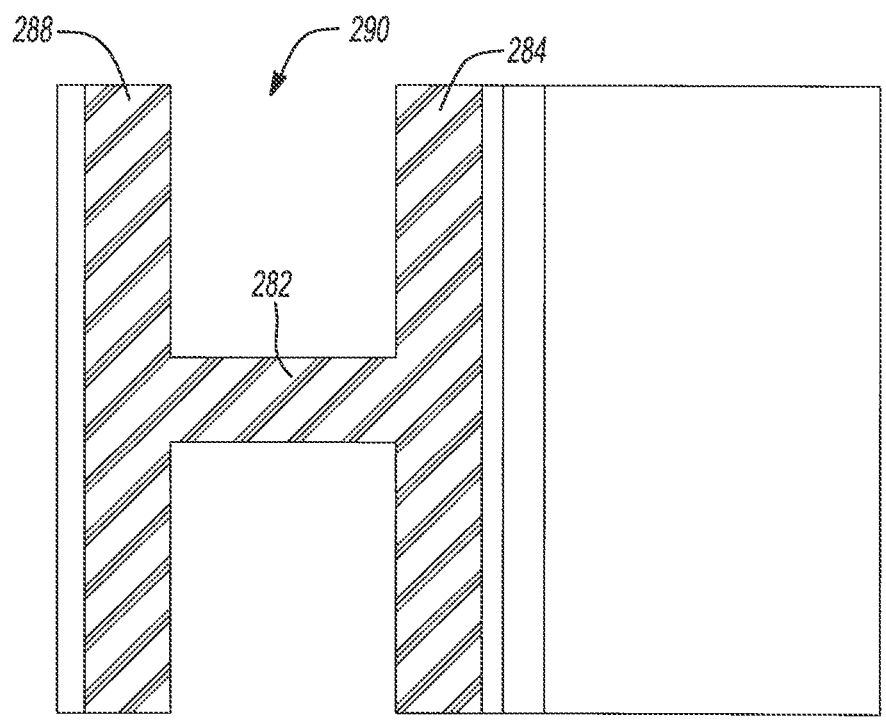
FIG. 12 is a cross-sectional view of the interlocking portion taken along line 12-12 of FIG. 11.
Figure 13:
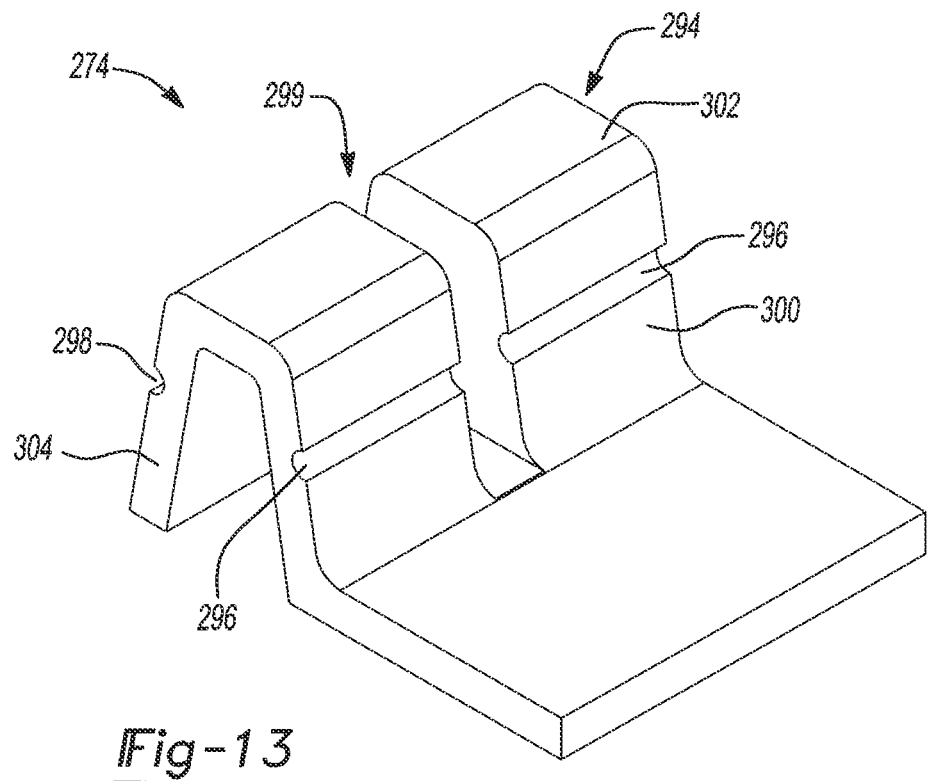
FIG. 13 is a perspective view of the adapter portion of FIG. 9.
Figure 14:
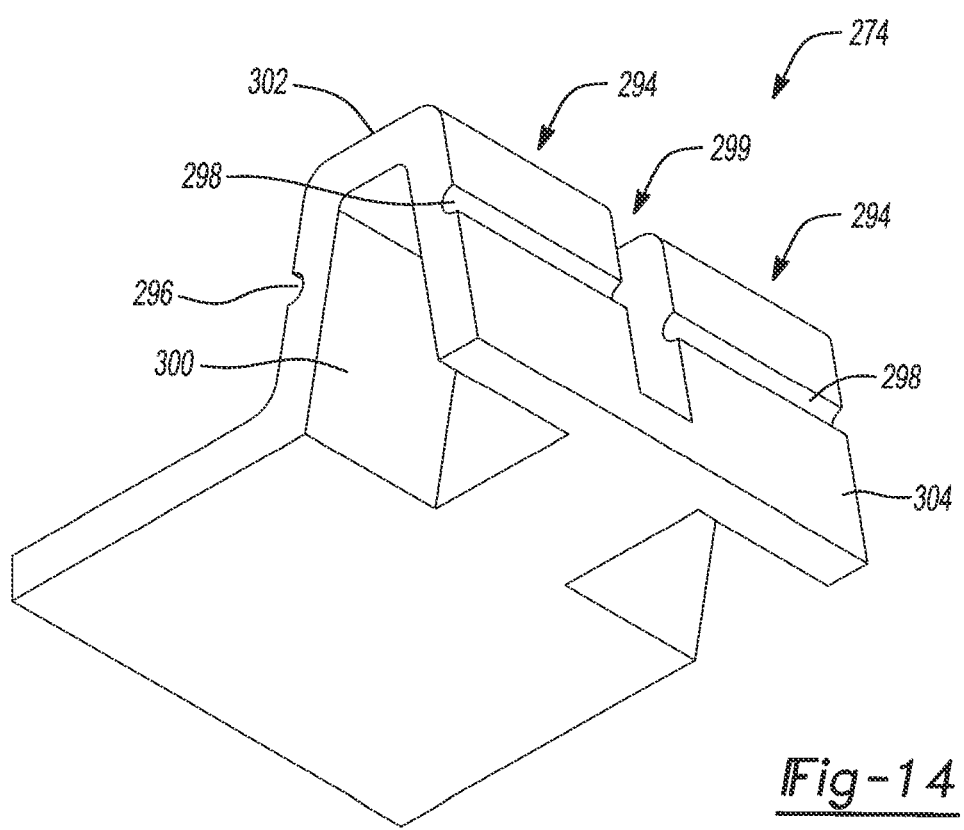
FIG. 14 is a bottom perspective view of the adapter portion of FIG. 9.

As shown in FIG. 4, the interlocking portion 34 of the extended floor mat 28 extends from a periphery of the floor portion 32 and includes a body 46, a plurality of first ribs 48 and a plurality of second ribs 50. The body 46 extends from the periphery of the floor portion 32 and has ends sections 52 and a locking or middle section 54. The end sections 52 extend upwardly on an angle from respective ends of the locking section 54 away from the vehicle floor 26. The end sections 52 and the locking section 54 include an inner wall 56, an intermediate wall 58 and an outer wall 60 that cooperate to define a channel 62.

The plurality of first ribs 48 are disposed in the channel 62 of the locking section 54. Each first rib 48 extends laterally across the channel 62 from the inner wall 56 to the outer wall 60 and includes an angled surface 64 and a horizontal surface 66. The angled surface 64 extends upwardly from a bottom end of the inner wall 56 to an end of the horizontal surface 66. The horizontal surface 66 extends from an end of the angled surface 64 to the outer wall 60.

The plurality of second ribs 50 are disposed in the channel 62 of the locking section 54. Each second rib 50 is disposed between a pair of the plurality of first ribs 48. In this way, the first ribs 48 and the second ribs 50 are arranged in an alternating fashion and form compartments 67 therebetween. Each second rib 50 extends laterally across the channel 62 from the outer wall 60 to the inner wall 56 and includes an angled surface 68 and a horizontal surface 70. The angled surface 68 extends upwardly from a bottom end of the outer wall 60 to an end of the horizontal surface 70. The horizontal surface 70 extends from an end of the angled surface 68 to the inner wall 56.

The connecting floor mat 30 is substantially rectangular-shaped (FIG. 1) and is made out of a copolymer material (e.g., thermoplastic elastomer). It should be understood that although the connecting floor mat 30 in the present disclosure is substantially rectangular-shaped, the connecting floor mat 30 can be any other suitable shape depending on the configuration of the vehicle floor 26. The connecting floor mat 30 is formed from a molding process (e.g., injection molding) and includes a floor portion 72 and an adapter portion 74. The floor portion 72 includes design features that accommodate floor configurations of vehicles that the connecting floor mat 30 is disposed therein. For example, in the embodiment illustrated herein, the floor portion 72 includes a base surface 76 and a rim 78.

The base surface 76 includes one section 80 and another section 82. The one section 80 includes a plurality of first elongated gripping members 84 and a second elongated gripping member 85. The first gripping members 84 extend upwardly from the base surface 76. The first gripping members 84 also extend from a rear end of the one section 80 toward a front end of the one section 80. The second gripping member 85 extends upwardly from the base surface 76. The second gripping member 85 also extends around a periphery of the one section 80. The rim 78 extends from and around a periphery of the base surface 76 away from the vehicle floor 26.

The adapter portion 74 extends from a periphery of the floor portion 72 and includes end portions 86, a plurality of locking tabs 88 and first and second receptacles 90, 92. Each end portion 86 is received in the channel 62 of a corresponding end section 52 and is partially received in the channel 62 the locking section 54 to restrict horizontal movement (i.e., lateral and front-to-back) of the connecting floor mat 30 relative to the extended floor mat 28. Each locking tab 88 is received in a corresponding compartment 67 of the interlocking portion 34 to further restrict horizontal movement (i.e., lateral and front-to-back) of the connecting floor mat 30 relative to the extended floor mat 28. Each locking tab 88 also includes a plurality of walls (comprised of a first end wall 94a, a second end wall 94b, bottom wall 94c, inner wall 94d and outer wall 94e) that cooperate to define a cavity 96.

Each first receptacle 90 is defined by the first end wall 94a of a corresponding locking tab 88, the second end wall 94b of a corresponding locking tab 88, an inside angled wall 98, a bottom wall 100 and an outside wall 102. The inside angled wall 98 extends upwardly from a periphery of the floor portion 72 to the top wall 100. The top wall 100 extends from an end of the inside angled wall 98 to the outside wall 102. Once the locking tabs 88 are received into the compartments 67 of the interlocking portion 34, a surface of the inside angled wall 98 contacts the angled surface 68 of a corresponding second rib 50 and the outside wall 102 contacts the inner wall 56 of the interlocking portion 34. This further restricts horizontal movement (i.e., lateral and front-to-back) of the connecting floor mat 30 relative to the extended floor mat 28.

Each second receptacle 92 is defined by the second end wall 94b of a corresponding locking tab 88, the first end wall 94a of a corresponding locking tab 88, an outside angled wall 104, a top wall 106 and an inside wall 108. The outside angled wall 104 extends upwardly from a rim 110 of the second receptacle 92 to the top wall 106. The top wall 106 extends from an end of the outside angled wall 104 to the inside wall 108. Once the locking tabs 88 are received into the compartments 67 of the interlocking portion 34, a surface of the outside angled wall 104 contacts the angled surface 64 of a corresponding first rib 48 and the inside wall 108 contacts the outer wall 60 of the interlocking portion 34. This further restricts horizontal movement (i.e., lateral and front-to-back) of the connecting floor mat 30 relative to the extended floor mat 28.

With continued reference to FIGS. 1-8, installation and removal of the floor mat assembly 24 will be now be described in detail. A user (not shown) disposes the extended floor mat 28 on the vehicle floor 26 at the left side of the rear row 16 and the connecting floor mat 30 on the vehicle floor 26 at the right side of the rear row 16. The user interlocks the connecting floor mat 30 and the extended floor mat 28 such that each end portion 86 is received in the channel 62 of a corresponding end section 52 and is partially received in the channel 62 of the locking section 54, and the locking tabs 88 are received in the compartments 67 of the interlocking portion 34, thereby restricting horizontal movement (i.e., lateral and front-to-back) of the connecting floor mat 30 relative to the extended floor mat 28.

When the user wishes to remove the floor mat assembly 24 from the vehicle 10 (e.g., for cleaning), the user disconnects the extended floor mat 28 and the connecting floor mat 30 and removes each floor mat 28, 30 out of the vehicle separately. In this way, the user conveniently removes the floor mat assembly 24 from the vehicle 10 and avoids inadvertently spilling debris and fluids on the vehicle floor 26. It should be understood that the floor mat assembly 24 in the present disclosure reduces shipping cost as the extended floor mat 28 and the connecting floor mat 30 can be stacked on top of each other, for example, during shipping, thereby, reducing packaging material necessary to ship the floor mat assembly 24.

With reference to FIGS. 9-14, another interlocking portion 234 and adapter portion 274 are provided. The interlocking portion 234 may be incorporated into the extended floor mat 28 instead of the interlocking portion 34 described above and the adapter portion 274 may be incorporated into the connecting floor mat 30 instead of the adapter portion 74 described above. The structure and function of the interlocking portion 234 and the adapter portion 274 may be similar or identical to that of the interlocking portion 34 and the adapter portion 74, respectively, apart from any exception described below.

The interlocking portion 234 includes a body 276, a plurality of first ribs 278, a plurality of second ribs 280 (only one shown in FIGS. 9-11) and a partition 282. The body 276 includes an inner wall 284, an intermediate wall 286 and an outer wall 288 that cooperate to define a cavity 290. The plurality of first ribs 278 are disposed within the cavity 290 and along a surface of the outer wall 288. The plurality of second ribs 280 are disposed within the cavity 290 and along a surface of the inner wall 284. The plurality of first ribs 278 and the plurality of second ribs 280 face each other within the cavity 290. The partition 282 is disposed within the cavity 290 and extends laterally across the cavity 290 from the inner wall 284 to the outer wall 288. The partition 282 is also disposed between a pair of the plurality of first ribs 278 and between a pair of the plurality of second ribs 280.

The adapter portion 274 includes a body 294, a plurality of first grooves 296, a plurality of second grooves 298 and a pocket 299. The body 294 includes an inside wall 300, a transition wall 302 and an outside wall 304. The plurality of first grooves 296 are formed in the inside wall 300 and the plurality of second grooves 298 are formed in the outside wall 304. The pocket 299 is formed in the body 294 between a pair of the plurality of first grooves 296 and between a pair of the plurality of second grooves 298.

The interlocking portion 234 is disposed over the adapter portion 274 such that the plurality of first ribs 278 are received in the plurality of first grooves 296, the plurality of second ribs 280 are received in the plurality of second grooves 298 and the partition 282 is received in the pocket 299, thereby restricting vertical and lateral movement of the extended floor mat 28 and the connecting floor mat 30 relative to each other.

What is claimed is:

1. A floor mat assembly configured to at least partially cover a floor of a vehicle, the floor mat assembly comprising:
   an extended floor mat including a floor portion and an interlocking portion, the interlocking portion extending from a periphery of the floor portion and including a body, at least one first rib and at least one second rib, the body defining a channel, the at least one first rib and the at least one second rib disposed in the channel of the body and cooperating to form a compartment therebetween; and
   a connecting floor mat including a floor portion and an adapter portion, the adapter portion extending from a periphery of the floor portion and including at least one locking tab,
   wherein the extended floor mat and the connecting floor mat interlock when the at least one locking tab is received in the compartment to restrict lateral movement of the extending floor mat and the connecting floor mat relative to each other.

2. The floor mat assembly of claim 1, wherein the floor portion of the extended floor mat includes a base surface, and wherein the base surface has a plurality of elongated gripping members.

3. The floor mat assembly of claim 2, wherein the floor portion of the connecting floor mat includes a base surface, and wherein the base surface has a plurality of elongated gripping members.

4. The floor mat assembly of claim 1, wherein the channel of the body is defined by an inner wall, an intermediate wall and an outer wall.

5. The floor mat assembly of claim 4, wherein the at least one first rib extends laterally across the channel and includes a first angled surface and a first horizontal surface.

6. The floor mat assembly of claim 5, wherein the first angled surface of the at least one first rib extends upwardly from a bottom end of the inner wall to an end of the first horizontal surface and the first horizontal surface extends from an end of the first angled surface to the outer wall.

7. The floor mat assembly of claim 6, wherein the at least one second rib extends laterally across the channel and includes a second angled surface and a second horizontal surface.

8. The floor mat assembly of claim 7, wherein the second angled surface extends upwardly from a bottom end of the outer wall to an end of the second horizontal surface and the second horizontal surface extends from an end of the second angled surface to the inner wall.

9. The floor mat assembly of claim 8, wherein the at least one locking tab includes a plurality of walls that cooperate to define a cavity.

10. A floor mat assembly configured to at least partially cover a floor of a vehicle, the floor mat assembly comprising:
    an extended floor mat including a floor portion and an interlocking portion, the interlocking portion extending from a periphery of the floor portion and including a first body, a plurality of first ribs, a plurality of second ribs and a partition, the first body including an inner wall, an intermediate wall and an outer wall cooperating to define a cavity, the plurality of first ribs disposed within the cavity and along the outer wall, the plurality of second ribs disposed within the cavity and along the inner wall, the partition disposed within the cavity and extending laterally across the cavity; and
    a connecting floor mat including a floor portion and an adapter portion, the adapter portion extending from a periphery of the floor portion and including a second body, a pocket, a plurality of first grooves and a plurality of second grooves, the second body including an inside wall, a transition wall, and an outside wall, the pocket formed in the second body, the plurality of first grooves formed in the inside wall and the plurality of second grooves formed in the outside wall,
    wherein the extended floor mat and the connecting floor mat interlock when the plurality of first ribs are received in the plurality of first grooves, the plurality of second ribs are received in the plurality of second grooves and the partition is received in the pocket, thereby restricting vertical and lateral movement of the extended floor mat and the connecting floor mat relative to each other.

11. The floor mat assembly of claim 10, wherein the partition of the extended floor mat is disposed between a pair of the plurality of first ribs and a pair of the plurality of second ribs.

12. The floor mat assembly of claim 11, wherein the pocket formed in the second body is between a pair of the plurality of first grooves and a pair of the plurality of second grooves.

13. The floor mat assembly of claim 12, wherein the interlocking portion of the extended floor mat is disposed over the adapter portion of the connecting floor mat once the extended floor mat and the connecting floor mat interlock.

14. The floor mat assembly of claim 13, wherein the plurality of first ribs and the plurality of second ribs face each other within the cavity.

15. The floor mat assembly of claim 10, wherein a cross-section of the interlocking portion is H-shaped.

* * * * *